United States Patent
Onda et al.

(10) Patent No.: US 11,152,772 B2
(45) Date of Patent: Oct. 19, 2021

(54) CUT-AWAY CUTTING TOOL

(71) Applicant: HONDA MOTOR CO., LTD., Tokyo (JP)

(72) Inventors: Hideaki Onda, Tochigi-ken (JP); Takayuki Motojima, Tochigi-ken (JP); Kenji Masai, Tochigi-ken (JP); Keita Miyashita, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/362,825

(22) Filed: Mar. 25, 2019

(65) Prior Publication Data

US 2019/0296529 A1    Sep. 26, 2019

(30) Foreign Application Priority Data

Mar. 26, 2018 (JP) .............................. JP2018-058109

(51) Int. Cl.
*H02G 1/12* (2006.01)
*H02K 15/04* (2006.01)

(52) U.S. Cl.
CPC ............. *H02G 1/126* (2013.01); *H02G 1/127* (2013.01); *H02K 15/04* (2013.01)

(58) Field of Classification Search
CPC ...... H02G 1/126; H02G 1/127; H02G 1/1256; H02G 1/1251; H02G 1/1253; H02G 1/005; H02G 1/12; H02G 1/1209; H02G 1/1217; H02G 1/1248; H02G 1/1265; H02G 1/1295; H02G 1/1297; H02G 1/1268; H02G 1/1285; B25D 3/00; H01B 15/005; H01B 15/006; B26D 3/16; B26D 3/167; B26D 3/168; H02K 15/04; Y10T 29/514

USPC ......... 81/9.4, 9.51; 30/167, 90.1, 90.4, 90.6, 30/90.8; 83/389, 692, 947

See application file for complete search history.

(56) References Cited

U.S. PATENT DOCUMENTS

| 7,635 | A | * | 9/1850 | Spencer | ................... | B27F 5/02 |
| | | | | | | 144/75 |
| 82,058 | A | * | 9/1868 | Adams et al. | ........... | B25D 3/00 |
| | | | | | | 30/167 |
| 597,020 | A | * | 1/1898 | Potter | ..................... | B25D 3/00 |
| | | | | | | 30/167 |
| 637,463 | A | * | 11/1899 | Hegarty | .................. | B25D 3/00 |
| | | | | | | 30/167 |

(Continued)

FOREIGN PATENT DOCUMENTS

| JP | 62220236 A | * | 9/1987 |
| JP | 2011-182597 | | 9/2011 |
| JP | 2017-131023 | | 7/2017 |

OTHER PUBLICATIONS

Chinese Office Action and Search Report for Chinese Patent Application No. 201910234121.5 dated Apr. 1, 2020.

*Primary Examiner* — Jason Daniel Prone
*Assistant Examiner* — Samuel A Davies
(74) *Attorney, Agent, or Firm* — Amin, Turocy & Watson, LLP (57) ABSTRACT

A cut-away cutting tool has two slit forming blade portions and a peeling blade portion interposed between the two slit forming blade portions. The two slit forming blade portions respectively form slits on an insulating coating of a flat conductor wire. On the other hand, the peeling blade portion peels off a portion of the insulating coating between the slits formed by the two slit forming blade portions.

4 Claims, 8 Drawing Sheets

(56) References Cited

U.S. PATENT DOCUMENTS

| | | | | |
|---|---|---|---|---|
| 1,513,100 A * | 10/1924 | Frederick | B23D 21/02 | 83/39 |
| 2,041,806 A * | 5/1936 | Bartol, Jr. | B26B 5/005 | 30/314 |
| 2,521,688 A * | 9/1950 | Cataldo | H02G 1/1295 | 81/9.51 |
| 2,634,775 A * | 4/1953 | Unsinger | B25D 3/00 | 30/167 |
| 2,693,028 A * | 11/1954 | Stoddard | B27L 3/00 | 30/121 |
| 3,176,396 A * | 4/1965 | Straka | B25D 3/00 | 30/168 |
| 3,527,124 A * | 9/1970 | Ullman | H02G 1/1256 | 81/9.51 |
| 3,820,420 A * | 6/1974 | Matthews | H02G 1/1226 | 30/91.2 |
| 3,832,767 A * | 9/1974 | Petree | H02G 1/1295 | 29/867 |
| 4,130,040 A * | 12/1978 | Donnelly, Sr. | H02G 1/005 | 83/389 |
| 4,387,746 A * | 6/1983 | Meehan | H02G 1/005 | 140/105 |
| 4,527,451 A * | 7/1985 | Davis | H02G 1/1268 | 81/9.51 |
| 4,600,005 A * | 7/1986 | Hendel | B26D 3/06 | 30/167 |
| 4,793,170 A * | 12/1988 | Daniels | B21C 35/04 | 72/255 |
| 4,930,384 A * | 6/1990 | Nakatsuji | B21D 28/28 | 72/325 |
| 5,979,286 A * | 11/1999 | Burth | H01B 15/006 | 83/861 |
| 6,427,331 B1 * | 8/2002 | Tarpill | H02G 1/1217 | 30/90.1 |
| 6,546,617 B1 * | 4/2003 | Hayashi | H02G 1/1202 | 29/426.4 |
| 6,635,004 B2 * | 10/2003 | Conger | B26D 7/1863 | 225/93 |
| 8,739,665 B2 * | 6/2014 | DeGrace | H02G 1/1209 | 30/353 |
| 2005/0050713 A1 * | 3/2005 | Locher | H02G 1/1268 | 29/564.4 |
| 2005/0211025 A1 * | 9/2005 | Steuri | H02G 1/1256 | 81/9.51 |
| 2018/0083428 A1 * | 3/2018 | Shigematsu | H02G 1/126 | |
| 2018/0083430 A1 * | 3/2018 | Sakamoto | H02G 1/1248 | |

* cited by examiner

CUT-AWAY CUTTING TOOL

CROSS-REFERENCE TO RELATED APPLICATION

This application is based upon and claims the benefit of priority from Japanese Patent Application No. 2018-058109 filed on Mar. 26, 2018, the contents of which are incorporated herein by reference.

BACKGROUND OF THE INVENTION

Field of the Invention

The present invention relates to a cut-away cutting tool for cutting away an insulating coating from a flat conductor wire.

Description of the Related Art

Flat conductor wires in which electric conductors are coated with insulating coatings have been in wide use as, for example, winding wires or the like for electromagnetic coils of rotary electric machines. Here, the insulating coatings are of insulation property, and therefore, it is necessary to remove the insulating coatings from portions at which the electromagnetic coils are electrically connected to electronic elements or the like.

Such insulating coatings are removed under the operation of a peeling device. Japanese Laid-Open Patent Publication No. 2011-182597 discloses a peeling device. For the purpose of avoiding the generation of coating burrs at corner portions and of performing peeling processing at a high speed while restraining the insulating coating from being deformed, the known device has protruding blades and peeling blades and peels off the insulating coating with the peeling blades after forming slit lines on the insulating coating with the protruding blades.

SUMMARY OF THE INVENTION

As described in Japanese Laid-Open Patent Publication No. 2011-182597, the protruding blades and the peeling blades are configured as independent members, in other words, as separate bodies. Therefore, it is necessary to independently provide a mechanism for moving the protruding blades upward and downward and another mechanism for moving the peeling blades upward and downward. This gives rise to a problem that the peeling device is enlarged in scale and becomes complicated in configuration.

A primary object of the present invention is to provide a cut-away cutting tool that is formed as a single body and capable of cutting away insulating coating from a flat conductor wire.

According to one embodiment of the present invention, there is provided a cut-away cutting tool for cutting away an insulating coating from a flat conductor wire which has an electric conductor and the insulating coating covering the electric conductor, the cut-away cutting tool comprising:

two slit forming blade portions for forming slits on the insulating coating; and a peeling blade portion interposed between the two slit forming blade portions for peeling off a portion of the insulating coating between the slits formed by the two slit forming blade portions.

Like this, in the present invention, the slit forming blade portions for forming slits (so-called cuts) and the peeling blade portion for peeling off the insulating coating are provided on the same cut-away cutting tool. Therefore, it is possible to complete operations from the forming of the slits to the cutting-away of the insulating coating by one cut-away cutting tool. In addition, the aforementioned operations can be completed by making the cut-away cutting tool approach the flat conductor wire. Further, because the peeling blade portion is interposed between the two slit forming blade portions, it is possible to provide the slit forming blade portions by machining a conventional peeling cutting tool, and hence, it is possible to realize the downsizing of the peeling device.

That is, with the aforementioned configuration, it becomes unnecessary to provide a plurality of cutting tools and lifting mechanisms. Therefore, it becomes possible to realize the downsizing of the peeling device and the simplification of the configuration. Further, it is also possible to realize the cost reduction in investment for equipment.

It is preferable that the two slit forming blade portions protrude relative to the peeling blade portion. In this case, the slit forming blade portions bite into the insulating coating in the beginning. This bite forms slits at the boundaries between a portion to be peeled off and a portion not to be peeled off, and between the bitten portions, the insulating coating is pushed out by the peeling blade portion. Therefore, the insulating coating is not torn. Accordingly, it is possible to accurately cut away the insulating coating at a desired portion from the flat conductor wire.

It is preferable that tip blades of the two slit forming blade portions be formed in a rounded shape at corner portions adjacent to a tip portion of the peeling blade portion. The reason for this is that because stresses acting on the tips of the slit forming blade portions are dispersed by the rounded portions, the blade portions are not chipped.

Further, it is preferable that the peeling blade portion be slanted to become thicker in a direction away from the flat conductor wire. The insulating coating which is peeled off by the tip blade of the peeling blade portion from the electrical conductor is turned up along the slant. Therefore, it becomes easy to cut away the insulating coating.

The peeling blade portion may gradually become wider as the peeling blade portion comes close to the flat conductor wire. This is because the configuration of the peeling blade portion enables the turning-up to proceed further smoothly.

According to the present invention, the cut-away cutting tool is configured to provide on the same cut-away cutting tool the slit forming blade portions for forming the slits and the peeling blade portion for peeling off the insulating coating. With this configuration, it is possible to complete the operations from the formation of the slits on the insulating coating to the cutting-away of the same by bringing the single cut-way cutting tool close to the flat conductor wire.

This makes it unnecessary to provide a plurality of cutting tools and lifting mechanisms, and thus, it is possible to realize the downsizing of the peeling device and the simplification of the configuration. As a consequence, it is also possible to realize the cost reduction in investment for equipment.

The above and other objects, features, and advantages of the present invention will become more apparent from the following description when taken in conjunction with the accompanying drawings, in which a preferred embodiment of the present invention is shown by way of an illustrative example.

DESCRIPTION OF THE PREFERRED EMBODIMENTS

With reference to the accompanying drawings, a preferred embodiment of a cut-away cutting tool according to the present invention will be described in detail based on a preferred embodiment.

Figure 1:
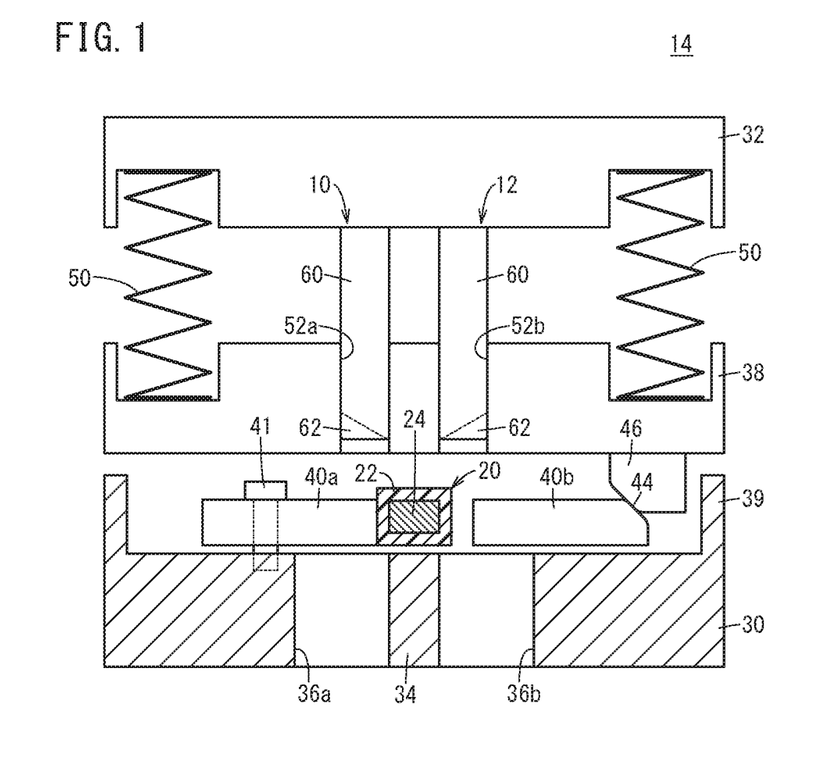
FIG. 1 is a schematic sectional view of an important portion of a peeling device with a cut-away cutting tool according to an embodiment of the present invention.

FIG. 1 is a schematic sectional view of a principal portion of a peeling device 14 equipped with a left cut-way cutting tool 10 and a right cut-way cutting tool 12 which are each a cut-way cutting tool according to the present embodiment. This peeling device 14 is used to expose an electric conductor 24 by cutting away an insulating coating 22 from a flat conductor wire 20.

The electric conductor 24 is formed of, for example, copper, aluminum or the like and takes a substantially rectangular shape in a cross section perpendicular to the extending direction. On the other hand, the insulating coating 22 is formed of, for example, a resin or the like showing electric insulation property. The insulating coating 22 is formed in a substantially rectangular frame shape in a cross section in a direction perpendicular to the longitudinal direction. The thickness of the insulating coating 22 is approximately the same everywhere.

The peeling device 14 has a base 30 for supporting the flat conductor wire 20, a movable platen 32 supporting the left cut-way cutting tool 10 and the right cut-way cutting tool 12, and a lifting mechanism (not shown) for moving the movable platen 32 upward and downward.

Figure 2:
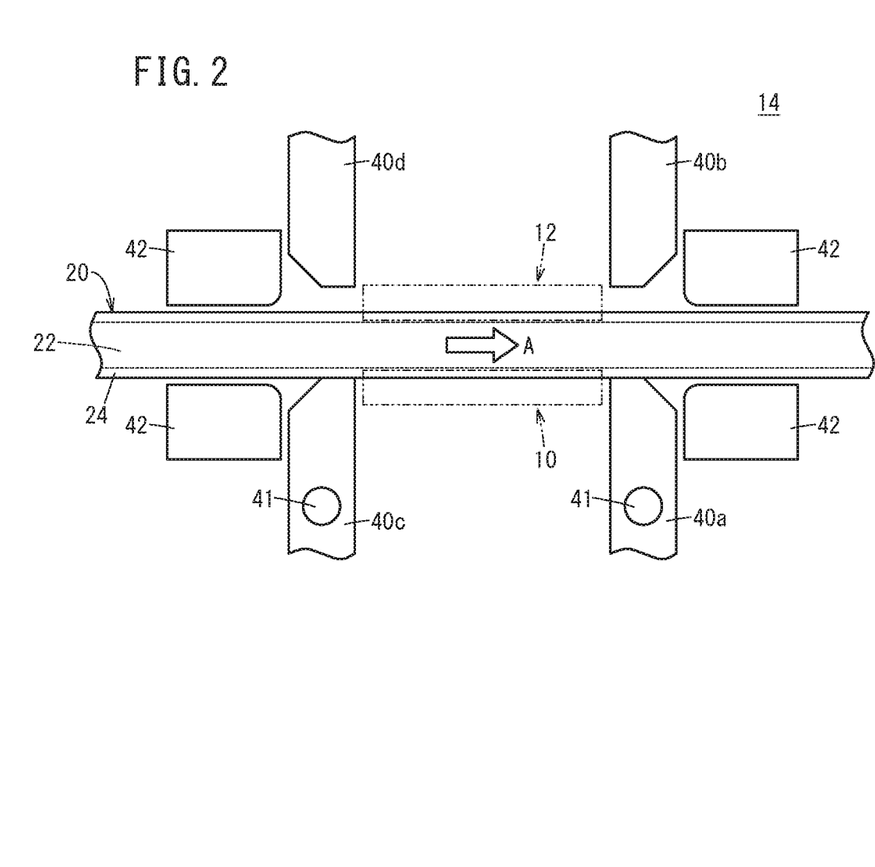
FIG. 2 is a fragmentary schematic plan view of the important portion of the peeling device shown in FIG. 1.

The base 30 is provided with a pedestal portion 34 allowing the flat conductor wire 20 to be slidingly moved thereon. Waste holes 36a, 36b extending in a vertical direction are formed on the both sides of the pedestal portion 34. Furthermore, at both end portions in the width direction of the base 30, stopper portions 39 for stopping a later-described cam platen 38 are provided protruding toward a cam platen 38. As shown in FIG. 2, the base 30 is provided with grip members 40a to 40d for gripping the flat conductor wire 20 from both lateral surfaces. The grip members 40a, 40b face each other with the flat conductor wire 20 put therebetween. The grip members 40c, 40d face each other with the flat conductor wire 20 put therebetween, at a position apart from the grip members 40a, 40b. Incidentally, reference numeral 42 in FIG. 2 denotes guides.

The grip members 40a, 40c are positioned and fastened on the base 30 by installation bolts 41. On the other hand, the grip members 40b, 40d are respectively provided with follower cams portions 44 at their end portions on the side farther from the flat conductor wire 20 (refer to FIG. 1). Further, the grip members 40b, 40d are elastically urged respectively by return springs (not shown) in a direction away from the flat conductor wire 20.

The cam platen 38 is interposed between the base 30 and the movable platen 32. A drive cam portion 46 is provided on a lower end surface of the cam platen 38. A drive cam surface of the drive cam portion 46 is able to slidingly contact with respective follower cam portions 44 of the grip members 40b, 40d. Further, the cam platen 38 and the movable platen 32 are connected through coil springs 50 which are elastic bodies.

The cam platen 38 is formed with insertion holes 52a, 52b. The left cut-away cutting tool 10 is inserted through the insertion hole 52a while the right cut-way cutting tool 12 is inserted through the insertion hole 52b.

The left cut-away cutting tool 10 has a shank portion 60 of a substantially quadrangular prism shape and a blade portion 62. The shank portion 60 is supported by the lifting mechanism, and the blade portion 62 faces the flat conductor wire 20.

Figure 3:
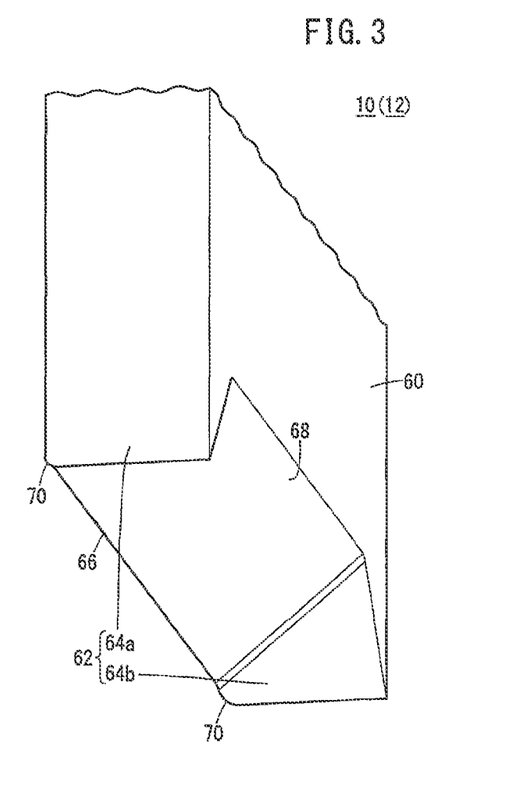
FIG. 3 is an enlarged schematic perspective view of the vicinity of a blade portion in the cut-away cutting tool.
Figure 4:
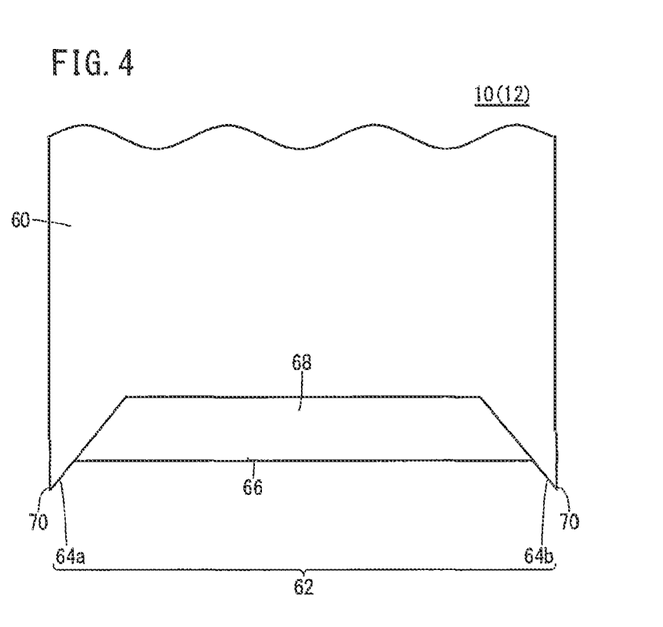
FIG. 4 is an enlarged schematic plan view of the vicinity of the blade portion in the cut-away cutting tool.

FIGS. 3 and 4 are respectively an enlarged schematic perspective view and an enlarged schematic plan view of the vicinity of the blade portion 62. The blade portion 62 of the left cut-away cutting tool 10 has two slit forming blade portions 64a, 64b and a peeling blade portion 66 interposed between the slit forming blade portions 64a, 64b. Sharp tips of the slit forming blade portions 64a, 64b is located at a position protruding beyond a tip of the peeling blade portion 66 and thus, are brought into contact with the insulating coating 22 earlier than the peeling blade portion 66 is.

Tip blades of the slit forming blade portions 64a, 64b extend in the thickness direction of the left cut-away cutting tool 10. On the other hand, a tip blade of the peeling blade edge 66 extends in the width direction (the arrow A direction in FIG. 2) of the left cut-away cutting tool 10. The peeling blade edge 66 is formed to become wider as it comes close to the slit forming blade portions 64a, 64b and to become thicker as it comes close to the shank portion 60. Thus, a slant portion 68 is formed at the peeling blade edge 66.

The tip blades of the slit forming blade portions 64a, 64b each have a rounded shape at a corner portion adjacent to the tip blade of the peeling blade portion 66. That is, the tip blades of the slit forming blade portions 64a, 64b are respectively formed with rounded portions 70, and the tip blade of the peeling blade portion 66 is continuous with the rounded portions 70. As can be seen, fillets are formed respectively at the corner portions of the tip blades of the slit forming blade portions 64a, 64b where the tip blades of the slit forming blade portions 64a, 64b come close to the tip blade of the peeling blade portion 66.

The right cut-away cutting tool 12 takes the same configuration as the left cut-away cutting tool 10. Therefore, the same portions of the right cut-away cutting tool 12 as those of the left cut-away cutting tool 10 are given the same reference numerals and a detailed description thereof will be omitted.

Next, the effects of the left cut-away cutting tool 10 and the right cut-away cutting tool 12 according to the present embodiment will be described in conjunction with the operation of the peeling device 14. Incidentally, the following operations will be performed under a sequence control by a control circuit (not shown).

The flat conductor wire 20 is wound around a drum (not shown), and one end portion of the flat conductor wire 20 is pulled out. The one end portion pulled out is sent out by a delivery mechanism and is slid on the pedestal portion 34 of the base 30.

Figure 5:
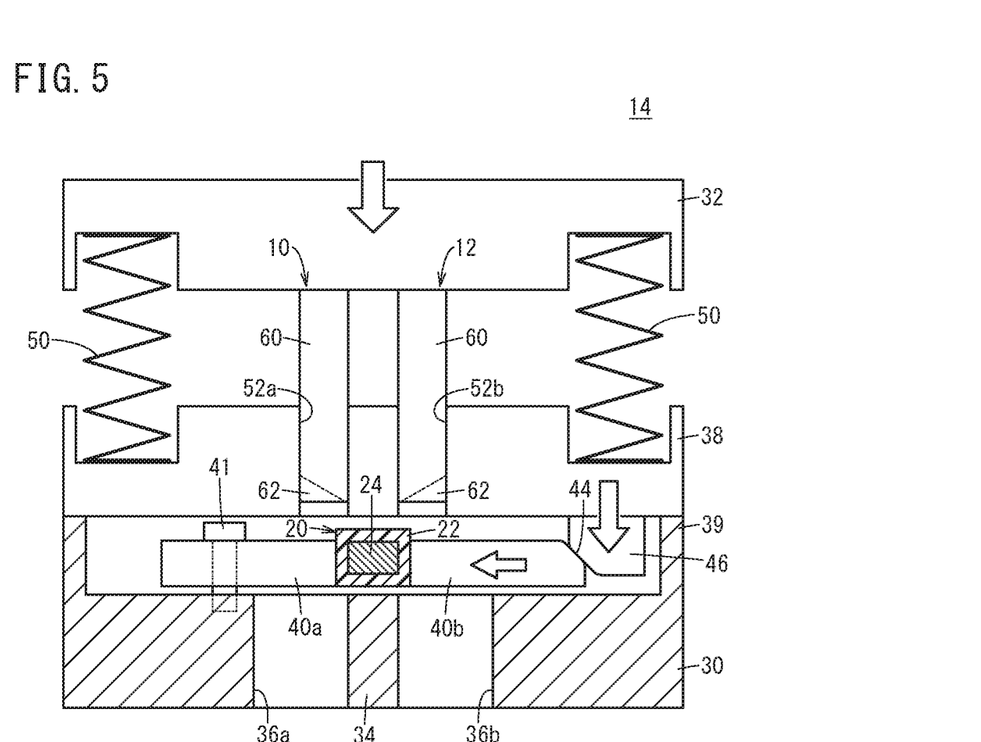
FIG. 5 is a schematic sectional view of the important portion in the state that the cut-way cutting tool has been moved downward from the state shown in FIG. 1.

In this state, the lifting mechanism is urged. Thus, the movable platen 32 and the cam planten 38 are moved downward, whereby as shown in FIG. 5, the drive cam surface of the drive cam portion 46 is brought into abutment on the respective follower cam portions 44 of the grip members 40*b*, 40*d*. Further downward movements of the movable platen 32 and the cam planten 38 cause the drive cam surface to be slid along the follower cam portions 44. Accordingly, the grip members 40*b*, 40*d* are pushed out toward a lateral portion side of the flat conductor wire 20 and cooperate with the grip members 40*a*, 40*c* positioned and fixed in advance on the base 30, sandwiching the flat conductor wire 20 therebetween.

Even after the cam platen 38 abuts against the stopper portions 39 and is stopped with the flat conductor wire 20 sandwiched between the grip members 40*a* to 40*d*, the movable platen 32 is moved downward. At this time, the coil springs 50 interposed between the movable platen 32 and the cam platen 38 are compressed. The compression enables the movable platen 32 to be moved downward even after the cam platen 38 is stopped.

The left cut-away cutting tool 10 and the right cut-away cutting tool 12 are moved downward together with the downward movement of the movable platen 32. That is, the left cut-away cutting tool 10 and the right cut-away cutting tool 12 are displaced in a direction to come close to the flat conductor wire 20. As a result, as exemplified in FIG. 6, the tip blades of the slit forming blade portions 64*a*, 64*b* of the right cut-away cutting tool 12 bite into the right lateral surface of the insulating coating 22. When the movable platen 32 is further moved downward in this state, the amount that the slit forming blade portions 64*a*, 64*b* bite into the insulating coating 22 becomes large, whereby two slits 80*a*, 80*b* are formed on the insulating coating 22.

Figure 6:
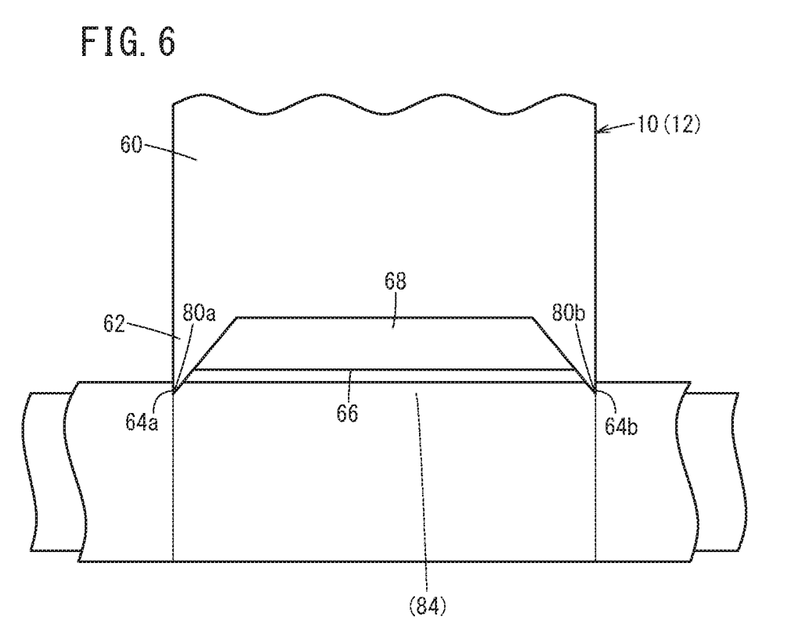
FIG. 6 is a right side view of the important portion in the state that the cut-way cutting tool has been moved downward from the state shown in FIG. 1.

Because the tip blades of the slit forming blade portions 64*a*, 64*b* are very sharp, biting and slit-making operations proceed smoothly. Further, because the tip blades of the slit forming blade portions 64*a*, 64*b* protrude farther than the tip blade of the peeling blade portion 66, the tip blades of the slit forming blade portions 64*a*, 64*b* easily bite into the insulating coating 22. Each of the slits 80*a*, 80*b* is formed on a boundary between a portion to be peeled off and a portion not to be peeled off, and between the slits 80*a*, 80*b*, the insulating coating 22 is pushed out by the peeling blade portion 66. Thus, the insulating coating 22 is not torn. Accordingly, it is possible to accurately form the slits 80*a*, 80*b* at desired positions on the insulating coating 22, and it is also possible to accurately cut away the insulating coating 22 from a desired portion on the flat conductor wire 20.

Figure 7:
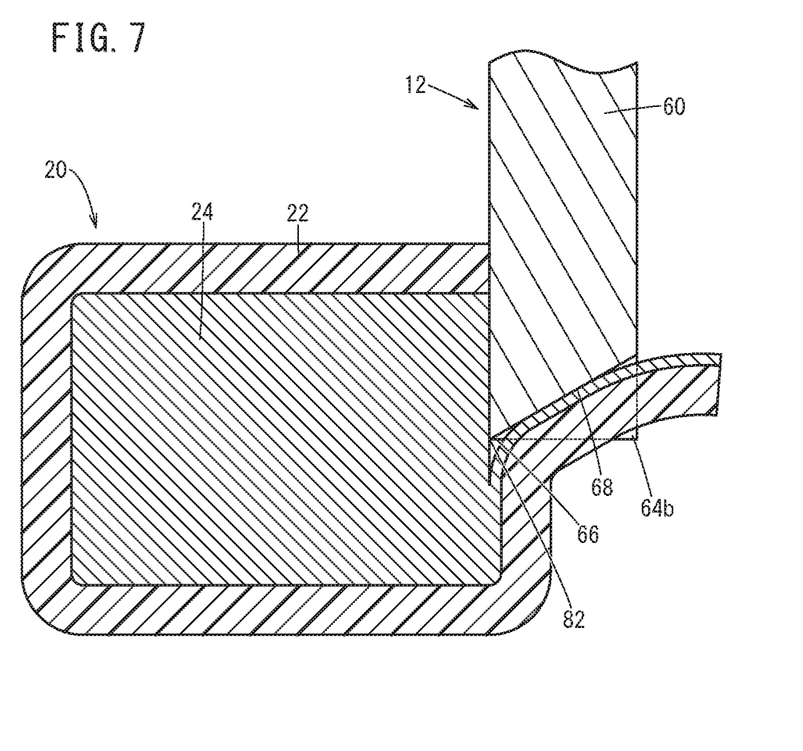
FIG. 7 is a cross-sectional front view of the important portion in the state that the cut-way cutting tool has been further moved downward from the state shown in FIG. 6.

When the movable platen 32 is further moved downward, the tip blade of the peeling blade portion 66 advances between the slits 80*a*, 80*b* and makes a slit 82 between the slits 80*a*, 80*b*. The tip blade of the peeling blade portion 66 is very sharp as described above. Thus, the advance of the slit 82 is also smooth. Then, the slit 82 spreads between the slits 80*a*, 80*b* having been formed ahead, so that as shown in FIG. 7, the insulating coating 22 is gradually peeled off from a portion between two slits 80*a*, 80*b* and the slit 82 of the electric conductor 24. The peeled-off portion (shaving) rises and curls in a direction away from the electric conductor 24 along the slant surface of the peeling blade portion 66. As can be seen, by providing the peeling blade portion 66 with the slant portion 68 that tilts away from the electric conductor 24, it becomes easy to peel off the insulating coating 22 from the electric conductor 24.

Figure 8:
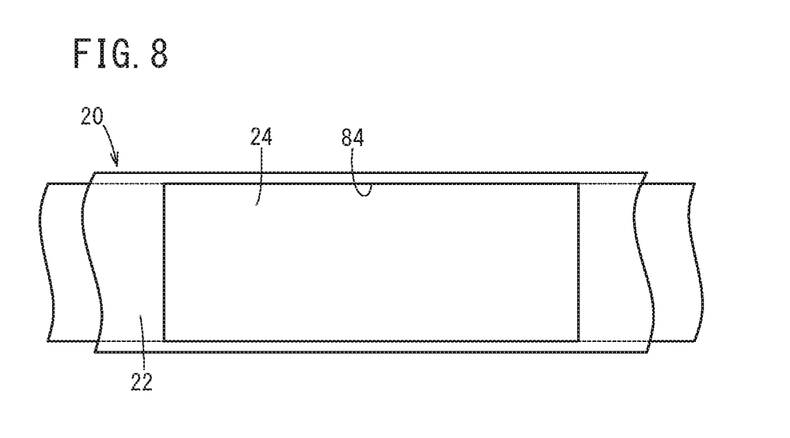
FIG. 8 is a right side view showing a portion of a flat conductor wire at which an insulating coating has been cut away.

When the right cut-away cutting tool 12 reaches a bottom dead point, the insulating coating 22 on the right lateral surface of the flat conductor wire 20 is cut away from the electric conductor 24 over a distance between the slits 80*a* and 80*b*, in other words, between the tip blades of the slit forming blade portions 64*a*, 64*b*. That is, as shown in FIG. 8, a window portion 84 is formed on the insulating coating 22, and a part of the right lateral surface of the electric conductor 24 is exposed from the window portion 84. Because the chamfers are provided between the tip blades of the slit forming blade portions 64*a*, 64*b* and the tip blade of the peeling blade portion 66, the surface of the window portion 84 is smooth. Furthermore, since the rounded portions 70 are provided on the right cut-away cutting tool 12, the stress which acts on each of the tips of the slit forming blade portions 64*a*, 64*b* disperses. For this reason, it can be avoided that the slit forming blade portions 64*a*, 64*b* are chipped.

Of course, the left cut-away cutting tool 10 cuts away the insulating coating 22 in the same manner, so that a part of the left lateral surface of the electric conductor 24 is exposed to the outside. This cut-away operation also proceeds smoothly. Further, in the same manner as described above, it is possible to prevent the insulating coating 22 from be torn and to prevent the slit forming blade portions 64*a*, 64*b* from being chipped. Incidentally, cut-away chips drop in the waste holes 36*a*, 36*b*.

As described hereinabove, according to the present embodiment, the cut-away cutting tool 10, 12 is configured to provide on the same cutting tool the blade portions for forming the slits 80*a*, 80*b* and the blade portion for forming the slit 82 between the slits 80*a*, 80*b* and to perform the operations from the formation of the slits 80*a*, 80*b* to the cut-away by one or single downward movement. Accordingly, it is not necessary to provide a plurality of lifting mechanisms. Thus, it is possible to realize the downsizing of the peeling device 14, the simplification of the configuration, and the cost reduction in investment for equipment.

After a part of the insulating coating 22 is cut away as described above, the movable platen 32 (refer to FIG. 1) is moved upward under the operation of the lifting mechanism. When the movable platen 32 is moved upward to a certain degree, the coil springs 50 expands, and further subsequently, the cam platen 38 is moved upward to follow the upward movement of the movable platen 32. As a consequence, the drive cam surface of the drive cam portion 46 is separated from the follower cam portions 44 of the grip members 40*b*, 40*d*. That is, the grip members 40*b*, 40*d* are released from the restraints of the drive cam portion 46.

The grip members 40*b*, 40*d* are further urged by the aforementioned return springs to be returned to the original positions. Thus, the flat conductor wire 20 is released from the restraints of the grip members 40*a* to 40*d*, so that it becomes possible to further send out the flat conductor wire 20. Subsequently, the aforementioned cut-away operation is performed on a different portion (on the downstream side in the sending-out direction) of the flat conductor wire 20.

Obviously, the present invention is not limited particularly to the foregoing embodiment. The present invention may, of course, take various configurations without departing from the gist of the present invention.

For example, a lower cut-away cutting tool for cutting away the insulating coating 22 on the lower end of the flat conductor wire 20 and an upper cut-away cutting tool for cutting away the insulating coating 22 on the upper end of the flat conductor wire 20 may take the same configurations as the left cut-away cutting tool 10 and the right cut-away cutting tool 12 described above.

What is claimed is:

1. A device comprising:
   a cut-away cutting tool configured to cut away an insulating coating from a flat conductor wire;
   a cam platen disposed between a movable platen and a base, wherein the movable platen supports the cut-away cutting tool and the cam platen comprises an insertion hole through which the cut-away cutting tool is inserted, the cut-away cutting tool comprising:
   a shank portion and a blade portion continuous from the shank portion and facing the flat conductor wire, the blade portion comprising:
      two slit forming blade surfaces respectively having tip blades extending parallel to one another along a thickness direction of the cut-away cutting tool; and
      a peeling blade comprising a peeling blade edge interposed between the two slit forming blade surfaces and extending perpendicular to the thickness direction in which the tip blades extend, wherein the peeling blade comprises a slant portion that is shaped wider at the peeling blade edge than at a side of the cut-away cutting tool facing away from the flat conductor wire, and
   wherein the peeling blade edge is disposed along a width direction transverse to a longitudinal length of the cut-away cutting tool and the tip blades extend substantially perpendicular to the width direction and the longitudinal length of the cut-away cutting tool, and
   the two slit forming blade surfaces are extended continuously from the peeling blade edge.

2. The device according to claim 1, wherein:
   the two slit forming blade surfaces protrude relative to the peeling blade edge.

3. The device according to claim 1, wherein:
   the tip blades of the two slit forming blade surfaces have rounded corner portions adjacent to a tip portion of the peeling blade edge.

4. The device according to claim 1, wherein:
   the peeling blade gradually becomes wider as the peeling blade comes closer to a contact point with the flat conductor wire.

* * * * *